United States Patent
Peng

(10) Patent No.: US 12,526,079 B2
(45) Date of Patent: Jan. 13, 2026

(54) DATA TRANSMISSION METHOD AND RELATED DEVICE

(71) Applicant: HUAWEI TECHNOLOGIES CO., LTD., Guangdong (CN)

(72) Inventor: Zhengyuan Peng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/254,371

(22) PCT Filed: Nov. 29, 2021

(86) PCT No.: PCT/CN2021/134058
§ 371 (c)(1),
(2) Date: May 24, 2023

(87) PCT Pub. No.: WO2022/111693
PCT Pub. Date: Jun. 2, 2022

(65) Prior Publication Data
US 2024/0031068 A1 Jan. 25, 2024

(30) Foreign Application Priority Data
Nov. 30, 2020 (CN) .......................... 202011384280.2

(51) Int. Cl.
*H04L 1/1809* (2023.01)
*H04L 1/00* (2006.01)

(52) U.S. Cl.
CPC .... *H04L 1/1809* (2013.01); *H04L 2001/0093* (2013.01)

(58) Field of Classification Search
CPC .......... H04L 1/1809; H04L 2001/0093; H04L 1/1896; H04L 12/1868; H04L 45/16; H04L 45/24; H04L 45/30; H04L 49/201; H04L 49/55

See application file for complete search history.

(56) References Cited

U.S. PATENT DOCUMENTS

| 8,768,252 B2 | 7/2014 | Watson et al. |
| 2014/0185458 A1 | 7/2014 | Yoo et al. |
| (Continued) | | |

FOREIGN PATENT DOCUMENTS

| CN | 1627725 A | 6/2005 |
| CN | 101222344 A | 7/2008 |
| (Continued) | | |

Primary Examiner — Mohamed A Kamara

(57) ABSTRACT

This application relates to the field of data transmission technologies, and in particular, to a data transmission method and a related device. The method includes: sending a first data packet to a first multicast group in a multicast manner, where the first multicast group includes a plurality of receiving ends; determining a quantity N of receiving ends that fail to receive the first data packet; and if N is less than a first threshold, sending information about a first receiving end to the receiving end that fails to receive the first data packet, where the first receiving end is a receiving end that successfully receives the first data packet. In solutions in embodiments of this application, requirements on bandwidth and processing performance of a sending end can be reduced during data resending.

9 Claims, 5 Drawing Sheets

(56) References Cited

U.S. PATENT DOCUMENTS

| | | | | |
|---|---|---|---|---|
| 2014/0362687 A1* | 12/2014 | Bejerano | ................. | H04L 12/18 |
| | | | | 370/230 |
| 2015/0372897 A1* | 12/2015 | Han | ....................... | H04L 47/00 |
| | | | | 370/254 |
| 2019/0109678 A1 | 4/2019 | Rollet | | |

FOREIGN PATENT DOCUMENTS

| | | | | | |
|---|---|---|---|---|---|
| CN | 102377576 | A | 3/2012 | | |
| CN | 103595546 | A | 2/2014 | | |
| CN | 105162706 | A | 12/2015 | | |
| CN | 105554639 | A | 5/2016 | | |
| CN | 109586932 | A | 4/2019 | | |
| CN | 110856086 | A | 2/2020 | | |
| CN | 111262660 | A | 6/2020 | | |
| WO | 2011086236 | A1 | 7/2011 | | |
| WO | WO-2011079552 | A1 * | 7/2011 | ............ | H04W 72/30 |
| WO | WO-2022002043 | A1 * | 1/2022 | ............. | H04L 47/10 |

* cited by examiner

DATA TRANSMISSION METHOD AND RELATED DEVICE

CROSS-REFERENCE TO RELATED APPLICATIONS

This application is a National Stage of International Application No. PCT/CN2021/134058, filed on Nov. 29, 2021, which claims priority to Chinese Patent Application No. 202011384280.2, filed on Nov. 30, 2020. The aforementioned priority applications are hereby incorporated by reference in their entirety.

TECHNICAL FIELD

This application relates to the field of data transmission technologies, and in particular, to a data transmission method and a related device.

BACKGROUND

In a data transmission scenario, a sending end may send data to a receiving end in a unicast or multicast manner. In the unicast manner, if there are N receiving ends, the sending end needs to make N−1 copies of the data, and then send N−1 pieces of data to the N receiving ends respectively. This manner has a high requirement on bandwidth of the sending end. In addition, when a large amount of data needs to be sent, the sending end is further required to have high processing performance. Otherwise, a data receiving and sending delay may be caused. In the multicast manner, a multicast group includes N receiving ends. The sending end needs to send only one piece of data to the multicast group, so that the receiving ends in the multicast group can receive the data. However, if one or more electronic devices in the multicast group fail to receive the data, the sending end needs to resend, in the unicast manner, the data that fails to be received. When there are a large quantity of electronic devices that fail to receive the data, there is still a disadvantage of high requirements on bandwidth and processing performance in the unicast manner.

SUMMARY

Embodiments of this application provide a data transmission method and a related device, to reduce requirements on bandwidth and processing performance of a sending end during data resending.

According to a first aspect, an embodiment of this application provides a data transmission method. The method is applied to a sending end, and includes: sending a first data packet to a first multicast group in a multicast manner, where the first multicast group includes a plurality of receiving ends; determining a quantity N of receiving ends that fail to receive the first data packet; and if N is less than a first threshold, sending information about a first receiving end to the receiving end that fails to receive the first data packet, where the first receiving end is a receiving end that successfully receives the first data packet. For example, the sending end may send the information about the first receiving end to a second receiving end, where the second receiving end is a receiving end that fails to receive the first data packet. After the second receiving end obtains the information about the first receiving end, the second receiving end may re-obtain the first data packet from the first receiving end. Optionally, there may be a plurality of second receiving ends. The second receiving ends may receive information about a same first receiving end. Optionally, the second receiving ends may receive information about different first receiving ends. That is, the second receiving ends may re-obtain first data packets from the different first receiving ends. In some embodiments, if the quantity N of receiving ends that fail to receive the first data packet is greater than or equal to the first threshold, the sending end may resend the first data packet to the first multicast group in the multicast manner.

In the foregoing solution in this embodiment of this application, when data is transmitted in the multicast manner, the sending end may determine a data resending policy based on the quantity of receiving ends that fail to receive the first data packet. If the quantity of receiving ends that fail to receive the first data packet does not exceed the first threshold, the first data packet may be resent via a receiving end that successfully receives the first data packet. In this way, resending pressure of the sending end can be dispersed to another electronic device, and requirements on bandwidth and processing performance of the sending end are reduced.

With reference to the first aspect, in some implementations of the first aspect, a manner in which the sending end determines the quantity N of receiving ends that fail to receive the first data packet includes: The sending end receives a first message sent by at least one of the plurality of receiving ends, where the first message includes an identifier of a data packet that fails to be received. The sending end determines, based on an identifier that is included in each first message and that is of a data packet that fails to be received, the quantity N of receiving ends that fail to receive the first data packet. In this embodiment of this application, the receiving ends receive the first data packet sent by the sending end in the multicast manner. If the receiving end fails to receive the first data packet, the receiving end may send the first message to the sending end, where the first message includes the identifier of the data packet that fails to be received. For example, if the first data packet fails to be received, the first message includes an identifier of the first data packet. In this way, the sending end may determine, based on the identifier that is included in each first message and that is of the data packet that fails to be received, the quantity N of receiving ends that fail to receive the first data packet.

With reference to the first aspect, in some implementations of the first aspect, the sending end sends a plurality of data packets in the multicast manner. Each receiving end in the first multicast group receives the plurality of data packets. If the receiving end fails to receive one of the data packets, the receiving end may send the first message to the sending end, where the first message includes the identifier of the data packet that fails to be received. The sending end may establish a to-be-resent-data table based on the identifier that is included in each first message and that is of the data packet that fails to be received, where the to-be-resent-data table includes an identifier of each data packet that fails to be received, and the identifier of each data packet is associated with an identifier of a receiving end that fails to receive the corresponding data packet. The sending end may determine, based on the to-be-resent-data table, the quantity N of receiving ends that fail to receive the first data packet. The first data packet may be any one of the plurality of data packets. For example, the sending end sends a data packet 1, a data packet 2, and a data packet 3. Each receiving end feeds back the first message to the sending end, where the first message includes the identifier of the data packet that fails to be received. For example, a receiving end 1 fails to receive the data packet 2, a receiving end 2 fails to receive the data packet 1, and a receiving end 3 fails to receive the data packets 1 and 3. In this case, the to-be-resent-data table that the sending end may establish may include: the data packet 1 and the identifiers of the receiving ends that fail to receive the data packet 1, the data packet 2 and the identifier of the receiving end that fails to receive the data packet 2, and the data packet 3 and the identifier of the receiving end that fails to receive the data packet 3. The sending end may determine, based on the to-be-resent-data table, a quantity of receiving ends that fail to receive any data packet.

With reference to the first aspect, in some implementations of the first aspect, the first threshold is determined based on a quantity of the receiving ends included in the first multicast group. In an example, the first threshold may be equal to a product of the quantity of the receiving ends and a first proportion coefficient. The first proportion coefficient may be set based on an actual requirement, for example, set to 0.5, 0.6, or 0.7.

With reference to the first aspect, in some implementations of the first aspect, the method further includes: determining a receiving end that successfully receives the first data packet; and determining the first receiving end in the receiving end that successfully receives the first data packet. Optionally, the sending end may determine, based on the receiving end that fails to receive the first data packet, the receiving end that successfully receives the first data packet. Optionally, the receiving end that successfully receives the first data packet may send a feedback message to the sending end, and the sending end determines, based on the feedback message, the receiving end that successfully receives the first data packet.

With reference to the first aspect, in some implementations of the first aspect, there may be a plurality of receiving ends that successfully receive the first data packet; and the determining the first receiving end in the receiving end that successfully receives the first data packet includes: obtaining resource occupation information of the receiving ends that successfully receive the first data packet; and determining, based on the resource occupation information, at least one first receiving end in the receiving ends that successfully receive the first data packet. Optionally, the sending end may randomly select at least one receiving end from the receiving ends that successfully receive the first data packet as the first receiving end. Optionally, the sending end may select the first receiving end based on the resource occupation information. For example, the sending end may select, as the first receiving end, a receiving end that corresponds to least resource occupation and that successfully receives the first data packet.

With reference to the first aspect, in some implementations of the first aspect, the sending a first data packet to a first multicast group in a multicast manner includes: sending a plurality of data packets having consecutive identifiers to the first multicast group in the multicast manner, where the plurality of data packets having the consecutive identifiers include the first data packet.

According to a second aspect, an embodiment of this application provides a data transmission method. The method is applied to a receiving end, and the receiving end joins a first multicast group, and the method includes: receiving a first data packet sent by a sending end to the first multicast group in a multicast manner; if the first data packet fails to be received, sending a first message to the sending end, where the first message includes an identifier of the first data packet; receiving information that is about a first receiving end and that is sent by the sending end, where the first receiving end is a receiving end that successfully receives the first data packet; sending a request message to the first receiving end based on the information about the first receiving end, where the request message is used to request the first receiving end to send the first data packet; and receiving the first data packet sent by the first receiving end based on the request message.

With reference to the second aspect, in some implementations of the second aspect, determining that the first data packet fails to be received includes: receiving a plurality of data packets that have consecutive identifiers and that are sent by the sending end; and determining, based on an identifier of a data packet that has been successfully received, that the first data packet fails to be received.

With reference to the second aspect, in some implementations of the second aspect, the sending end sends information about a plurality of first receiving ends; and the sending a request message to the first receiving end based on the information about the first receiving end includes: randomly sending the request message to one of the plurality of first receiving ends; or determining, in the plurality of first receiving ends, a first receiving end corresponding to least resource occupation, and sending the request message to the first receiving end corresponding to the least resource occupation.

According to a third aspect, an embodiment of this application provides an electronic device. The electronic device serves as a sending end, and includes one or more processors, a memory, and one or more computer programs, where the one or more computer programs are stored in the memory, and the one or more computer programs include instructions; and when the instructions are executed by the device, the electronic device is enabled to perform the following steps: sending a first data packet to a first multicast group in a multicast manner, where the first multicast group includes a plurality of receiving ends; determining a quantity N of receiving ends that fail to receive the first data packet; and if N is less than a first threshold, sending information about a first receiving end to the receiving end that fails to receive the first data packet, where the first receiving end is a receiving end that successfully receives the first data packet.

With reference to the third aspect, in some implementations of the third aspect, when the instructions are executed by the device, the device is enabled to specifically perform the following steps: receiving a first message sent by at least one of the plurality of receiving ends, where the first message includes an identifier of a data packet that fails to be received; and determining, based on an identifier that is included in each first message and that is of a data packet that fails to be received, the quantity N of receiving ends that fail to receive the first data packet.

With reference to the third aspect, in some implementations of the third aspect, when the instructions are executed by the device, the device is enabled to specifically perform the following steps: establishing a to-be-resent-data table based on the identifier that is included in each first message and that is of the data packet that fails to be received, where the to-be-resent-data table includes an identifier of each data packet that fails to be received, and the identifier of each data packet is associated with an identifier of a receiving end that fails to receive the corresponding data packet; and determining, based on the to-be-resent-data table, the quantity N of receiving ends that fail to receive the first data packet.

With reference to the third aspect, in some implementations of the third aspect, when the instructions are executed by the device, the device is enabled to specifically perform the following step: if N is greater than or equal to the first threshold, resending the first data packet to the first multicast group in the multicast manner.

With reference to the third aspect, in some implementations of the third aspect, when the instructions are executed by the device, the device is enabled to specifically perform the following steps: determining a receiving end that successfully receives the first data packet; and determining the first receiving end in the receiving end that successfully receives the first data packet.

With reference to the third aspect, in some implementations of the third aspect, when the instructions are executed by the device, the device is enabled to specifically perform the following steps: there are a plurality of receiving ends that successfully receive the first data packet; obtaining resource occupation information of the receiving ends that successfully receive the first data packet; and determining, based on the resource occupation information, at least one first receiving end in the receiving ends that successfully receive the first data packet.

With reference to the third aspect, in some implementations of the third aspect, when the instructions are executed by the device, the device is enabled to specifically perform the following step: sending a plurality of data packets having consecutive identifiers to the first multicast group in the multicast manner, where the plurality of data packets having the consecutive identifiers include the first data packet.

According to a fourth aspect, an embodiment of this application provides an electronic device. The electronic device serves as a receiving end, and the electronic device joins a first multicast group, and includes: one or more processors, a memory, and one or more computer programs, where the one or more computer programs are stored in the memory, and the one or more computer programs include instructions; and when the instructions are executed by the device, the electronic device is enabled to perform the following steps: receiving a first data packet sent by a sending end to the first multicast group in a multicast manner; if the first data packet fails to be received, sending a first message to the sending end, where the first message includes an identifier of the first data packet; receiving information a first receiving end that is sent by the sending end, where the first receiving end is a receiving end that successfully receives the first data packet; sending a request message to the first receiving end based on the information about the first receiving end, where the request message is used to request the first receiving end to send the first data packet; and receiving the first data packet sent by the first receiving end based on the request message.

With reference to the fourth aspect, in some implementations of the fourth aspect, when the instructions are executed by the device, the device is enabled to specifically perform the following steps: receiving a plurality of data packets that have consecutive identifiers and that are sent by the sending end; and determining, based on an identifier of a data packet that has been successfully received, that the first data packet fails to be received.

With reference to the fourth aspect, in some implementations of the fourth aspect, when the instructions are executed by the device, the device is enabled to specifically perform the following steps: information that is send by the sending end about a plurality of first receiving ends; and randomly sending the request message to one of the plurality of first receiving ends; or determining, in the plurality of first receiving ends, a first receiving end corresponding to least resource occupation, and sending the request message to the first receiving end corresponding to the least resource occupation.

According to a fifth aspect, an embodiment of this application provides a computer storage medium, including computer instructions. When the computer instructions are run on an electronic device, the electronic device is enabled to perform the data transmission method according to any one of the first aspect or the second aspect.

In conclusion, in the foregoing solutions in embodiments of this application, when the data is transmitted in the multicast manner, the sending end may determine the data resending policy based on the quantity of receiving ends that fail to receive the first data packet. If the quantity of receiving ends that fail to receive the first data packet does not exceed the first threshold, the first data packet may be resent via the receiving end that successfully receives the first data packet. In this way, the resending pressure of the sending end can be dispersed to the another electronic device, and the requirements on the bandwidth and processing performance of the sending end are reduced.

DESCRIPTION OF EMBODIMENTS

The following describes technical solutions in this application with reference to accompanying drawings.

Embodiments of this application provide a data transmission method. The data transmission method is applied to a multicast scenario. Specifically, a sending end may determine a resending policy based on a quantity of receiving ends that fail to receive data. If the quantity of receiving ends that fail to receive the data exceeds a threshold, the sending end may resend the data in a multicast manner. If the quantity of receiving ends that fail to receive the data does not exceed a specified threshold, the sending end may resend the data via a receiving end that successfully receives the data. In this way, resending pressure of the sending end can be dispersed to another electronic device, and requirements on bandwidth and processing performance of the sending end are reduced.

Figure 1:
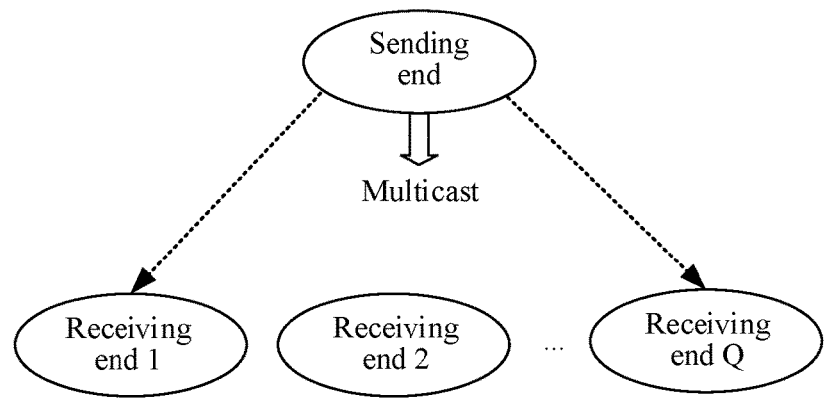
FIG. 1 is a schematic diagram of a multicast system according to an embodiment of this application.

FIG. 1 is a schematic diagram of a multicast system according to an embodiment of this application. As shown in FIG. 1, the multicast system includes a sending end and a plurality of receiving ends. The plurality of receiving ends may include, for example, a receiving end 1, a receiving end 2, . . . , and a receiving end Q. Q is greater than 2. The sending end may establish a multicast group based on a multicast protocol. The receiving end 1, the receiving end 2, . . . , and the receiving end Q may join the multicast group established by the sending end.

The sending end or the receiving end in the system shown in FIG. 1 may be an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the sending end or the receiving end is not limited in this embodiment of this application.

Figure 2:
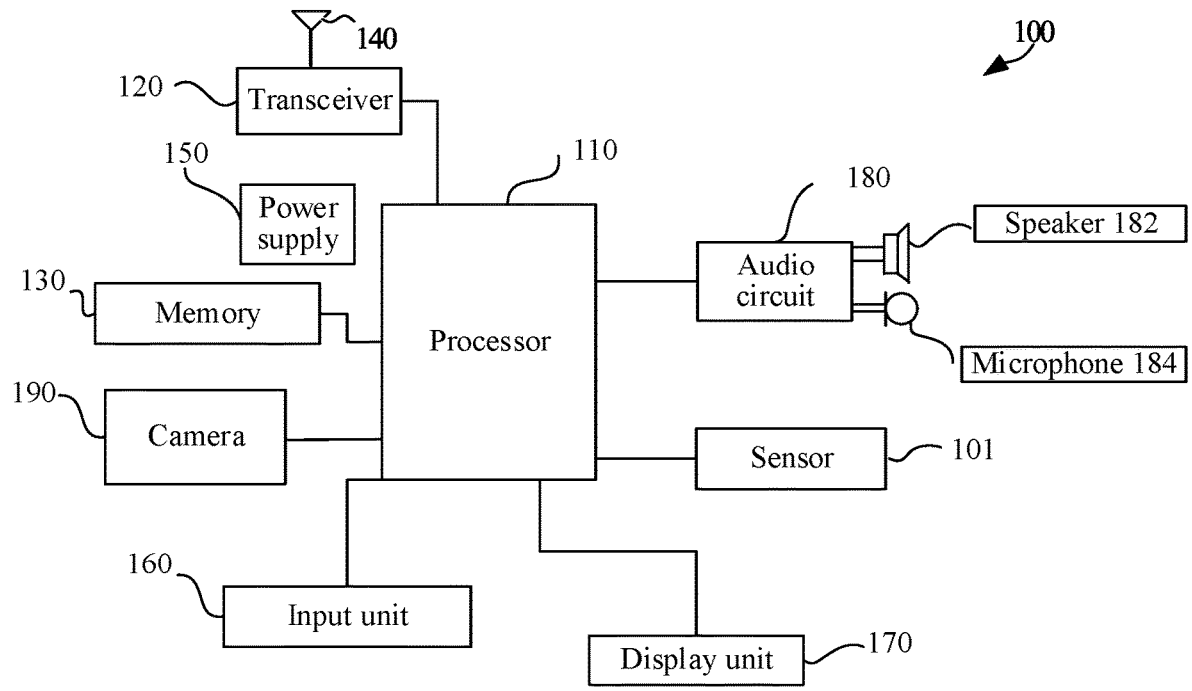
FIG. 2 is a schematic diagram of a structure of an electronic device according to an embodiment of this application.

FIG. 2 is a schematic diagram of a structure of an electronic device according to an embodiment of this application. The electronic device shown in FIG. 2 may serve as the sending end or the receiving end in the system shown in FIG. 1. As shown in FIG. 2, the electronic device 100 includes a processor 110 and a transceiver 120. Optionally, the electronic device 100 may further include a memory 130. The processor 110, the transceiver 120, and the memory 130 may communicate with each other through an internal connection path, to transfer a control signal and/or a data signal. The memory 130 is configured to store a computer program. The processor 110 is configured to invoke the computer program from the memory 130 and run the computer program.

Optionally, the electronic device 100 may further include an antenna 140, configured to send a radio signal output by the transceiver 120. In this embodiment of this application, the transceiver 120 may implement a mobile communication function and/or a wireless communication function. Optionally, the transceiver 120 may include a near field communication (Near Field Communication, NFC) module, configured to read NFC tag information of another electronic device. Optionally, the transceiver 120 may include a Bluetooth module and a wireless-fidelity (Wireless-Fidelity, Wi-Fi) module, respectively configured to implement a Bluetooth communication function and a Wi-Fi network access function.

The processor 110 and the memory 130 may be integrated into one processing apparatus, or more commonly, may be components independent of each other. The processor 110 is configured to execute program code stored in the memory 130, to implement the foregoing functions. During specific implementation, the memory 130 may alternatively be integrated into the processor 110 or independent of the processor 110.

In addition, to improve functions of the electronic device 100, the electronic device 100 may further include one or more of an input unit 160, a display unit 170, an audio circuit 180, a camera 190, a sensor 101, and the like, and the audio circuit may further include a speaker 182, a microphone 184, and the like. The display unit 170 may include a display.

Optionally, the electronic device 100 may further include a power supply 150, configured to supply power to various components or circuits in the electronic device.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of the software and the hardware.

Figure 3:
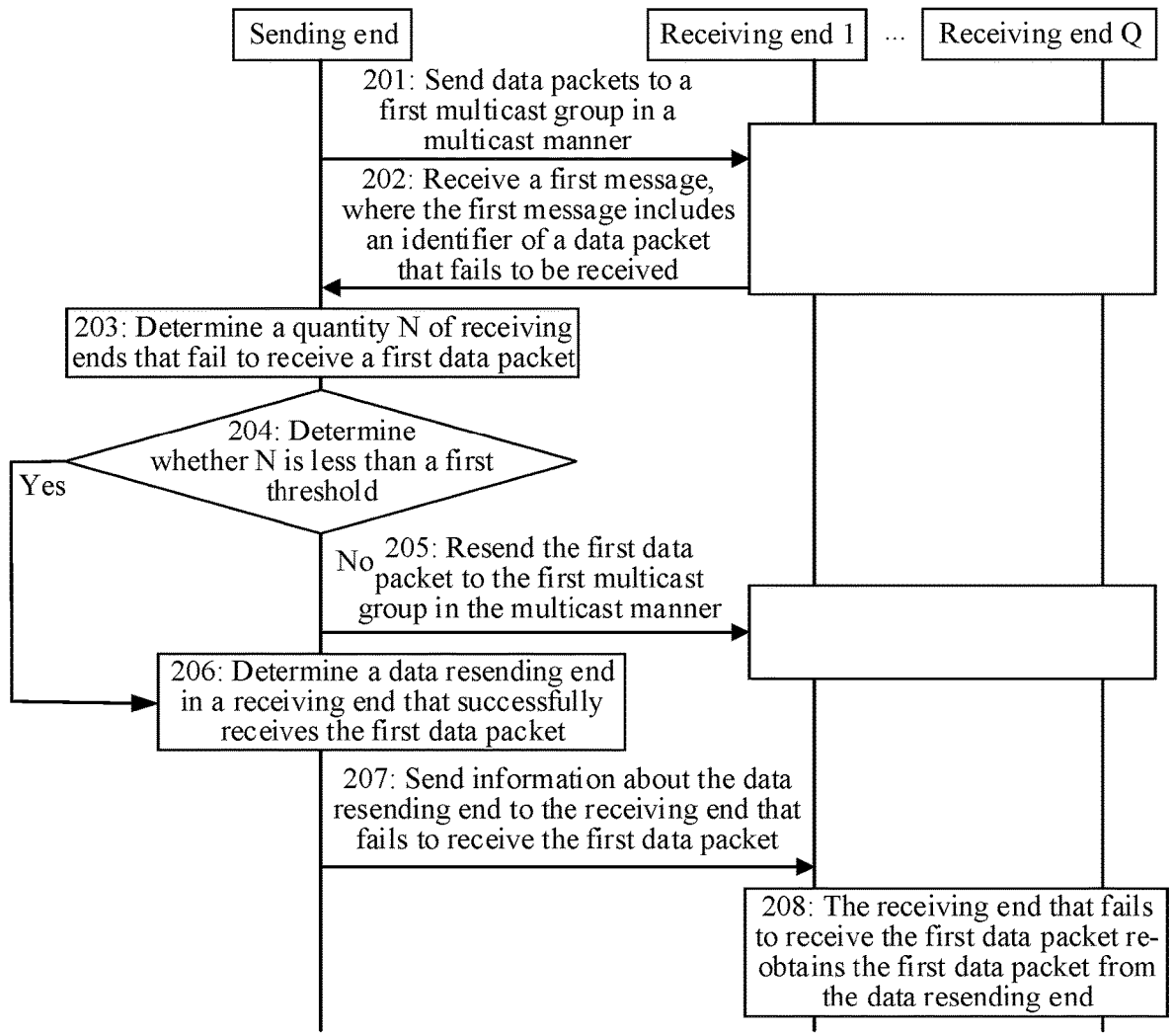
FIG. 3 is a flowchart of a data transmission method according to an embodiment of this application.

FIG. 3 is a flowchart of a data transmission method according to an embodiment of this application. The method shown in FIG. 3 is applied to the multicast system shown in FIG. 1. The sending end establishes a first multicast group. The receiving end 1, . . . , and the receiving end Q join the first multicast group. The sending end may send data packets to the first multicast group in a multicast manner. When the receiving end fails to receive the data packet, the sending end may determine a data packet resending policy based on a quantity of receiving ends that fail to receive the data packet. For specific steps, refer to FIG. 3. The following steps are included.

201: The sending end sends the data packets to the first multicast group in the multicast manner. Specifically, the sending end establishes the first multicast group. The first multicast group corresponds to a first multicast address. The sending end sends the data packets to the first multicast address as a destination address. The receiving ends (namely, the receiving end 1, . . . , and the receiving end Q) in the first multicast group monitor the data packets. When a destination address of a data packet obtained through monitoring is the first multicast address, the receiving end receives the corresponding data packet. When the receiving end determines that the data packet fails to be received, the receiving end sends a first message to the sending end. The first message includes an identifier of the data packet that fails to be received. Optionally, the receiving end may determine, based on an identifier of a received data packet, the data packet that fails to be received. In some embodiments, the sending end sends data packets having consecutive identifiers to the first multicast group. The receiving end determines, based on consecution of identifiers of received data packets, the data packet that fails to be received. For example, the sending end sends a data packet 1, a data packet 2, . . . , and a data packet X having consecutive numbers to the first multicast group in the multicast manner. If the receiving end 1 successfully receives the data packet 1, the data packet 3, . . . , and the data packet X, the receiving end 1 may determine, based on numbers of the successfully received data packets, that the data packet 2 fails to be received. The receiving end 1 sends the first message to the sending end, where the first message includes number information of the data packet 2. Likewise, the receiving end 2, . . . , and the receiving end Q may determine, in a same manner, a data packet that fails to be received, and feed back an identifier of the data packet that fails to be received to the sending end.

202: The sending end receives the first message, where the first message includes the identifier of the data packet that fails to be received. The sending end may determine, based on the identifier that is included in the first message and that is of the data packet, a quantity of receiving ends that fail to receive each data packet. For example, in the example provided in step 201, the sending end may determine, based on the number information that is of the data packet 2 and that is sent by the receiving end 1, that the receiving end 1 fails to receive the data packet 2. If the receiving end 3 and the receiving end 5 fail to receive the data packet 2 in addition to the receiving end 1, the sending end may determine that a quantity of receiving ends that fail to receive the data packet 2 is 3, where the receiving ends are the receiving end 1, the receiving end 3, and the receiving end 5.

203: The sending end determines a quantity N of receiving ends that fail to receive a first data packet, where the first data packet may be any one of the data packets sent by the sending end to the first multicast group. After the sending end receives the first message sent by one or more receiving ends, the sending end determines, based on the received first message, the quantity N of receiving ends that fail to receive the first data packet.

In some embodiments, the sending end may establish a to-be-resent-data table based on identifiers of data packets that fail to be received. The to-be-resent-data table includes the identifiers of the data packets that fail to be received. An identifier of each data packet is associated with an identifier of a device that fails to receive the corresponding data packet. The sending end may determine, based on the to-be-resent-data table, the quantity of receiving ends that fail to receive the first data packet.

In a specific example, the to-be-resent-data table established by the sending end may be shown in Table 1. In Table 1, an identifier of a data packet identifies a data packet that fails to be received, and the data packet that fails to be received is a data packet that needs to be resent; and an identifier of a device identifies a receiving end that fails to receive the data packet, where the receiving end that fails to receive the data packet is a receiving end that needs to re-obtain the data packet. The first row in Table 1 indicates that devices that fail to receive the data packet 1 include the receiving end 2 and the receiving end 4. The second row in Table 1 indicates that the devices that fail to receive the data packet 2 include the receiving end 1, the receiving end 3, and the receiving end 5. By analogy, meanings of other rows in Table 1 are not listed one by one. In this way, the sending end may determine, based on Table 1, the data packets that fail to be received and the devices that fail to receive the corresponding data packets.

TABLE 1

| Identifier of a data packet | Identifier of a device | | |
| --- | --- | --- | --- |
| Data packet 1 | Receiving end 2 | Receiving end 4 | |
| Data packet 2 | Receiving end 1 | Receiving end 3 | Receiving end 5 |
| . . . | | | |
| Data packet X | Receiving end 1 | Receiving end 5 | |

204: The sending end determines whether N is less than a first threshold. That is, the sending end determines whether the quantity N of receiving ends that fail to receive the first data packet is less than the first threshold. In some embodiments, the first threshold may be determined based on a quantity of the receiving ends included in the first multicast group. In an example, the first threshold may be equal to a product of the quantity of the receiving ends and a first proportion coefficient. The first proportion coefficient may be set based on an actual requirement, for example, set to 0.5, 0.6, or 0.7. Examples are not provided herein one by one again. Optionally, if N is less than the first threshold, the sending end performs step 206; or if N is not less than the first threshold, the sending end performs 205.

205: The sending end resends the first data packet to the first multicast group in the multicast manner. Specifically, when the quantity of receiving ends that fail to receive the first data packet in the first multicast group is greater than or equal to the first threshold, the sending end resends the first data packet in the multicast manner. That is, when a large quantity of receiving ends in the first multicast group all fail to receive the first data packet, the sending end resends the first data packet in the multicast manner. When resending the first data packet in the multicast manner, the sending end needs to send only one piece of data, so that a requirement on bandwidth for resending the first data packet by the sending end is reduced. Table 1 is still used as an example. It is assumed that the first multicast group includes five receiving ends, and the first threshold is 3. The quantity of receiving ends that fail to receive the data packet 2 is 3 that is equal to the first threshold. In this case, the sending end resends the first data packet to the first multicast group in the multicast manner.

206: The sending end determines a data resending end in a receiving end that successfully receives the first data packet. In some embodiments, if there is one receiving end that successfully receives the first data packet, the sending end determines the receiving end as the data resending end. In some embodiments, if there are a plurality of receiving ends that successfully receive the first data packet, the sending end may determine, as the data resending end, one or more receiving ends in the plurality of receiving ends.

In some embodiments, the sending end may randomly determine, as the data resending end, one receiving end in the plurality of receiving ends that successfully receive the first data packet. Optionally, the sending end may determine one data resending end for each receiving end that fails to receive the first data packet, and the receiving ends that fail to receive the first data packet all correspond to different data resending ends.

In a specific example, the first multicast group includes the receiving end 1, the receiving end 2, . . . , and the receiving end 5, and there are five receiving ends in total. The receiving end 2 and the receiving end 4 in the first multicast group fail to receive the data packet 1. In this case, the sending end may determine, based on information about the receiving ends that fail to receive the data packet, that receiving ends that successfully receive the data packet 1 include the receiving end 1, the receiving end 3, and the receiving end 5. The sending end determines, based on the total quantity of the receiving ends included in the first multicast group, that a quantity of the receiving ends that fail to receive the data packet 1 does not exceed the first threshold (where it is assumed that the first threshold is 3). The sending end determines a data resending end in the receiving end 1, the receiving end 3, and the receiving end 5. Optionally, the sending end may randomly select, as the data resending end, one receiving end from the receiving end 1, the receiving end 3, and the receiving end 5. For example, the sending end selects the receiving end 1 as the data resending end. The sending end sends information about the receiving end 1, for example, an Internet protocol (Internet Protocol, IP) address of the receiving end 1, to the receiving end 2 and the receiving end 4. The receiving end 2 and the receiving end 4 re-obtain the data packet 1 from the receiving end 1 based on the IP address of the receiving end 1. Optionally, the sending end may allocate one data resending end to the receiving end 2, and allocate one data resending end to the receiving end 4. For example, the sending end sends information about the receiving end 1 to the receiving end 2, and sends information about the receiving end 3 to the receiving end 4. In this case, the receiving end 2 re-obtains the data packet 1 from the receiving end 1 based on the information about the receiving end 1, and the receiving end 4 re-obtains the data packet 1 from the receiving end 4 based on the information about the receiving end 3.

In some embodiments, the sending end may obtain resource occupation information of the receiving ends that successfully receive the first data packet. The sending end determines, based on the resource occupation information, the data resending end in the receiving ends that successfully receive the first data packet.

In some embodiments, the sending end may use the receiving ends that successfully receive the first data packet as a first list, and send the first list to the receiving end that fails to receive the first data packet. The receiving end that fails to receive the first data packet determines or selects one receiving end as the data resending end based on the first list. The receiving end that fails to receive the first data packet re-obtains the first data packet from the data resending end. Optionally, the receiving end that fails to receive the first data packet may randomly select the receiving end from the first list as the data resending end. Optionally, the first list further includes resource occupation information of the receiving ends. The receiving end that fails to receive the first data packet determines the data resending end based on the resource occupation information that is of the receiving ends and that is in the first list. Optionally, the receiving end that fails to receive the first data packet may determine, as the data resending end, a receiving end that corresponds to least resource occupation and that is in the first list.

Resending of the data packet 1 in Table 1 is still used as an example. The sending end may determine a data resending end based on resource occupation information of the receiving end 1, the receiving end 3, and the receiving end 5.

In some embodiments, the resource occupation information may include, for example, bandwidth utilization, CPU utilization, and IO utilization.

TABLE 2

| Identifier of a device | Bandwidth utilization | CPU utilization | IO utilization |
|---|---|---|---|
| Receiving end 1 | 90% | 85 | 90% |
| Receiving end 3 | 80% | 70% | 90% |
| Receiving end 5 | 70% | 60% | 50% |

As shown in Table 2, the resource occupation information of the receiving end 1, the receiving end 3, and the receiving end 5 includes the bandwidth utilization, the CPU utilization, and the IO utilization. The sending end may calculate comprehensive resource utilization of the receiving end 1, the receiving end 3, and the receiving end 5 based on the bandwidth utilization, the CPU utilization, and the IO utilization. Optionally, the sending end may calculate the comprehensive resource utilization according to formula k=(k1A+k2B+k3C)/3. A indicates the bandwidth utilization, B indicates the CPU utilization, and C indicates the IO interface utilization. Herein, k1 is a weighting value of the bandwidth utilization, k2 is a weighting value of the CPU utilization, and k3 is a weighting value of the IO interface utilization.

The sending end may determine, based on the comprehensive resource utilization obtained through calculation, a receiving end having lowest comprehensive resource utilization as the data resending end. For example, the sending end determines the receiving end 5 as the data resending end.

207: The sending end sends information about the data resending end to the receiving end that fails to receive the first data packet. In an example, the sending end determines the receiving end 5 as a data resending end for resending the data packet 2. The sending end sends information about the receiving end 5, for example, an IP address of the receiving end 5, to the receiving end that fails to receive the first data packet.

208: The receiving end that fails to receive the first data packet re-obtains the first data packet from the data resending end. Optionally, the receiving end that fails to receive the first data packet obtains the information about the data resending end. The receiving end that fails to receive the first data packet sends a request message to the data resending end based on the information about the data resending end. The request message is used to request the data resending end to send the first data packet. The receiving end that fails to receive the first data packet receives the first data packet sent by the data resending end. In some embodiments, the information that is about the data resending end and that is obtained by the receiving end that fails to receive the first data packet is information about a plurality of receiving ends. In this case, the receiving end that fails to receive the first data packet may randomly send the request message to one of the plurality of receiving ends, to obtain the first data packet. In some embodiments, the receiving end that fails to receive the first data packet may obtain resource occupation information of the plurality of receiving ends. The receiving end that fails to receive the first data packet may determine, in the plurality of receiving ends, a receiving end corresponding to least resource occupation, and send the request message to the receiving end corresponding to the least resource occupation.

In a multicast solution in this embodiment of this application, when the quantity of receiving ends that fail to receive the first data packet exceeds the first threshold, the data packet may be resent in the multicast manner, to reduce requirements on bandwidth and processing performance of unicast resending of the sending end. When the quantity of receiving ends that fail to receive the first data packet does not exceed the first threshold, the first data packet may be resent via the receiving end that successfully receives the first data packet, to disperse pressure of data resending.

Figure 4:
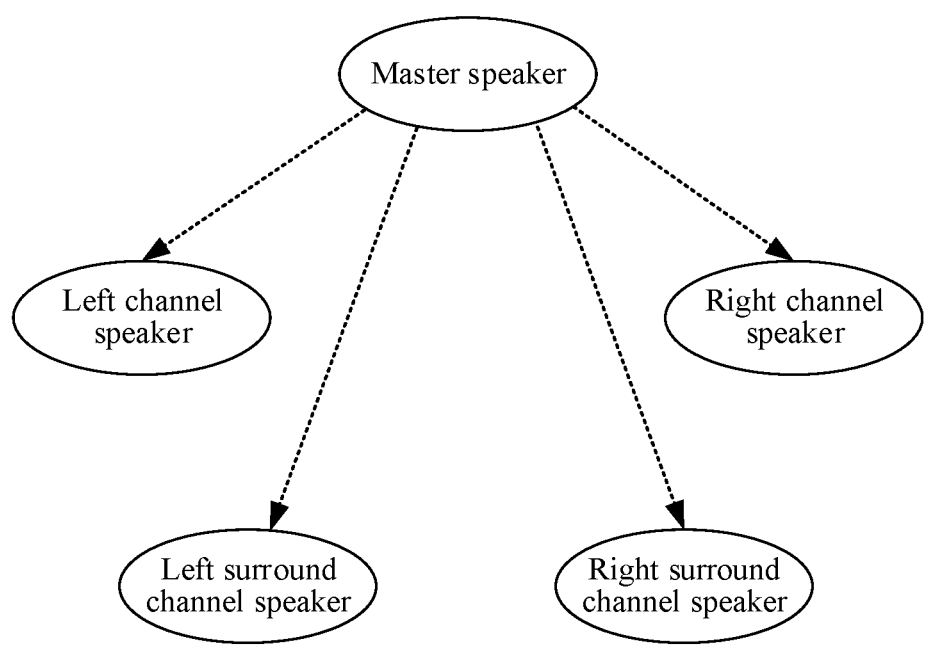
FIG. 4 is a schematic diagram of another multicast system according to an embodiment of this application.

FIG. 4 is a schematic diagram of another multicast system according to an embodiment of this application. As shown in FIG. 4, the system includes a master speaker, a left channel speaker, a right channel speaker, a left surround channel speaker, and a right surround channel speaker. The master speaker establishes a multicast group. The left channel speaker, the right channel speaker, the left surround channel speaker, and the right surround channel speaker are included in the multicast group. That the master speaker establishes the multicast group includes: The master speaker establishes control channels to the left channel speaker, the right channel speaker, the left surround channel speaker, and the right surround channel speaker based on the transmission control protocol (Transmission Control Protocol, TCP). In a process of establishing the control channels, the master speaker may determine an IP address of each speaker. In an example, IP addresses of the left channel speaker, the right channel speaker, the left surround channel speaker, and the right surround channel speaker are IP1, IP 2, IP 3, and IP 4 respectively. Then, the master speaker defines a name of the multicast group, and enables a multicast mode. For ease of description, the name that is of the multicast group and that is defined by the master speaker is a first multicast group. The master speaker sends information about the first multicast group to each speaker through the control channel. The speaker joins the first multicast group. As shown in FIG. a process in which the master speaker sends audio data packets to the speaker in the first multicast group based on the method in embodiments of this application includes the following steps.

311: The master speaker multicasts the audio data packets to the first multicast group. Optionally, the audio data packets that the master speaker multicasts have consecutive numbers. The speaker in the first multicast group receives the audio data packets that the master speaker multicasts. The speaker determines a number of a lost audio data packet based on a number of a successfully received audio data packet, and sends the number of the lost audio data packet to the master speaker.

302: The master speaker receives the number of the lost audio data packet. Optionally, the speaker in the first multicast group may send the number of the lost audio data packet to the master speaker through the control channel.

303: The master speaker establishes a to-be-resent-data table. Optionally, after receiving the number that is of the lost audio data packet and that is sent by the speaker, the master speaker establishes the to-be-resent-data table. As shown in Table 3, the to-be-resent-data table includes the number of the lost audio data packet and the IP address of the speaker that loses the corresponding audio data packet. The number of the lost audio data packet is a number of a data packet that needs to be resent. The IP address of the speaker that loses the corresponding audio data packet is an IP address of a speaker that needs to re-obtain the corresponding data packet.

TABLE 3

| Number of a data packet | IP address of a speaker | | |
|---|---|---|---|
| Data packet 1 | IP 1 | IP 2 | IP 4 |
| Data packet 2 | IP 1 | | |
| ... | | | |
| Data packet X | Receiving end 2 | | |

304: The master speaker determines a resending policy based on a quantity of speakers associated with the number of the lost data packet. If a quantity of speakers that lose the audio data packet x exceeds a threshold, step 305 is performed. If a quantity of speakers that lose the audio data packet does not exceed a threshold, steps 306 to 308 are performed. The lost audio data packet x may be any one of audio data packets that the first multicast group loses.

305: The master speaker multicasts the lost audio data packet x.

306: The master speaker determines, based on the to-be-resent-data table, speakers that successfully receive the audio data packet x, and the master speaker determines, as a data resending end, a speaker M in the speakers that successfully receive the audio data packet x.

307: The master speaker sends an IP address of the speaker M to the speaker that loses the audio data packet x.

308: The speaker that loses the audio data packet re-obtains the audio data packet x from the speaker M.

In this embodiment of this application, audio data is transmitted in a multicast manner, so that transmission efficiency is high, and occupied bandwidth is low. Further, when some audio data fails to be received, the audio data may be resent by performing policy-based selection on the multicast manner or a dispersed-unicast manner based on a quantity of speakers that fail to receive the audio data, to ensure data resending reliability and improve resending performance.

It may be understood that, to implement the foregoing functions, the sending end or the receiving end device includes corresponding hardware and/or software modules for performing the functions. With reference to the steps of each example described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use, with reference to embodiments, different methods to implement the functions for each specific application.

In embodiments, function module division may be performed on the sending end or the receiving end based on the foregoing method example. For example, function modules may be obtained through division based on corresponding functions, or two or more functions may be integrated in one processing module. The integrated module may be implemented in a form of hardware. It should be noted that, in embodiments, division into the modules is an example, and is merely logical function division. Another division manner may be used during actual implementation.

Figure 6:
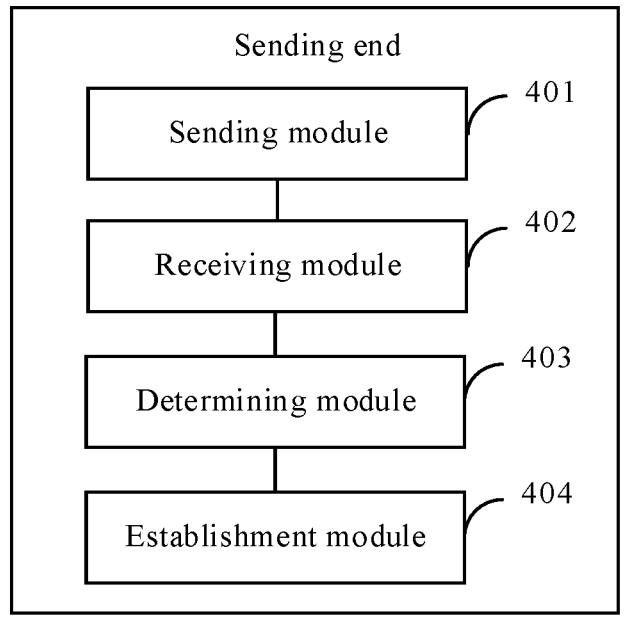
FIG. 6 is a schematic diagram of a structure of a sending end according to an embodiment of this application.

When function modules are obtained through division based on corresponding functions, FIG. 6 is a possible schematic diagram of composition of the sending end in the foregoing embodiments. As shown in FIG. 6, the sending end may include:

a sending module 401, configured to send a first data packet to a first multicast group in a multicast manner, where the first multicast group includes a plurality of receiving ends;

a receiving module 402, configured to receive a first message sent by at least one of the plurality of receiving ends, where the first message includes an identifier of a data packet that fails to be received; and a determining module 403, configured to determine, based on an identifier that is included in each first message and that is of a data packet that fails to be received, the quantity N of receiving ends that fail to receive the first data packet.

The sending module 401 is further configured to: when N is less than a first threshold, send information about a first receiving end to the receiving end that fails to receive the first data packet, where the first receiving end is a receiving end that successfully receives the first data packet.

In some embodiments, the sending module 401 is further configured to: when N is greater than or equal to the first threshold, resend the first data packet to the first multicast group in the multicast manner.

In some embodiments, the first threshold is determined based on a quantity of the receiving ends included in the first multicast group.

In some embodiments, the sending end further includes: an establishment module 404, configured to establish a to-be-resent-data table based on the identifier of the data packet that fails to be received, where the to-be-resent-data table includes an identifier of each data packet that fails to be received, and the identifier of each data packet is associated with an identifier of a receiving end that fails to receive the corresponding data packet.

The determining module 403 is specifically configured to determine, based on the to-be-resent-data table, the quantity N of receiving ends that fail to receive the first data packet.

In some embodiments, the determining module 403 is further configured to determine, based on the identifier of the data packet that fails to be received, a receiving end that successfully receives the first data packet; and determine the first receiving end in the receiving end that successfully receives the first data packet.

In some embodiments, there are a plurality of receiving ends that successfully receive the first data packet. The determining module 403 is specifically configured to obtain, by using the receiving module, resource occupation information of the receiving ends that successfully receive the first data packet; and determine, based on the resource occupation information, at least one first receiving end in the receiving ends that successfully receive the first data packet.

In some embodiments, the sending module 401 is specifically configured to send data packets having consecutive identifiers to the first multicast group in the multicast manner.

Figure 7:
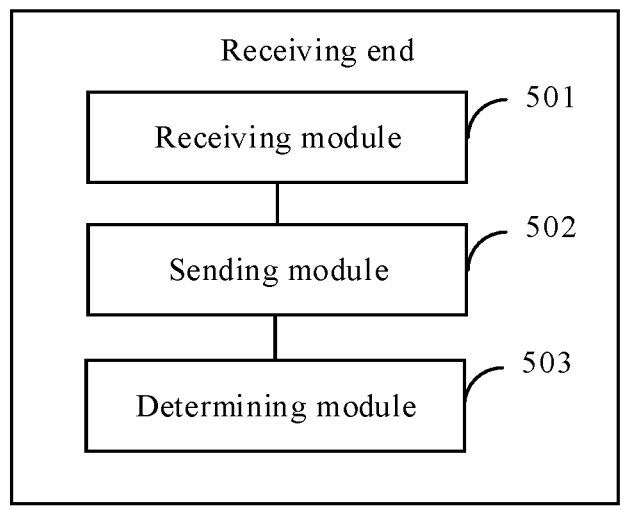
FIG. 7 is a schematic diagram of a structure of a receiving end according to an embodiment of this application.

When function modules are obtained through division based on corresponding functions, FIG. 7 is a possible schematic diagram of composition of the receiving end in the foregoing embodiments. As shown in FIG. 7, the receiving end may include:

a receiving module 501, configured to receive a first data packet sent by a sending end to a first multicast group in a multicast manner; and a sending module 502, configured to: when the first data packet fails to be received, send a first message to the sending end, where the first message includes an identifier of the first data packet that fails to be received.

The receiving module 501 is further configured to receive information about a first receiving end, where the first receiving end is a receiving end that successfully receives the first data packet.

The sending module 502 is further configured to send a request message to the first receiving end based on the information about the first receiving end, where the request message is used to request the first receiving end to send the first data packet.

The receiving module 501 is further configured to receive the first data packet sent by the first receiving end based on the request message.

In some embodiments, data packets sent by the sending end have consecutive identifiers.

In some embodiments, an electronic device further includes a determining module 503, configured to determine, based on an identifier of a data packet that has been successfully received, an identifier of a data packet that fails to be received.

In some embodiments, a second message includes information about a plurality of first receiving ends.

The sending module 502 is specifically configured to randomly send the request message to one of the plurality of first receiving ends; or the determining module 503 is further configured to determine, in the plurality of first receiving ends, a first receiving end corresponding to least resource occupation; and the sending module is specifically configured to send the request message to the first receiving end corresponding to the least resource occupation.

It should be understood that the electronic device herein is embodied in a form of a functional unit. The term "unit" herein may be implemented in a form of software and/or hardware. This is not specifically limited. For example, the "unit" may be a software program, a hardware circuit, or a combination thereof that implements the foregoing function. The hardware circuit may include an application-specific integrated circuit (application-specific integrated circuit, ASIC), an electronic circuit, a processor (for example, a shared processor, a dedicated processor, or a group processor) configured to execute one or more software or firmware programs, a memory, a combined logic circuit, and/or another suitable component that supports the function.

This application further provides an electronic device. The device includes a storage medium and a central processing unit. The storage medium may be a non-volatile storage medium. The storage medium stores a computer-executable program. The central processing unit is connected to the non-volatile storage medium, and executes the computer-executable program to implement the foregoing data transmission methods.

Figure 5:
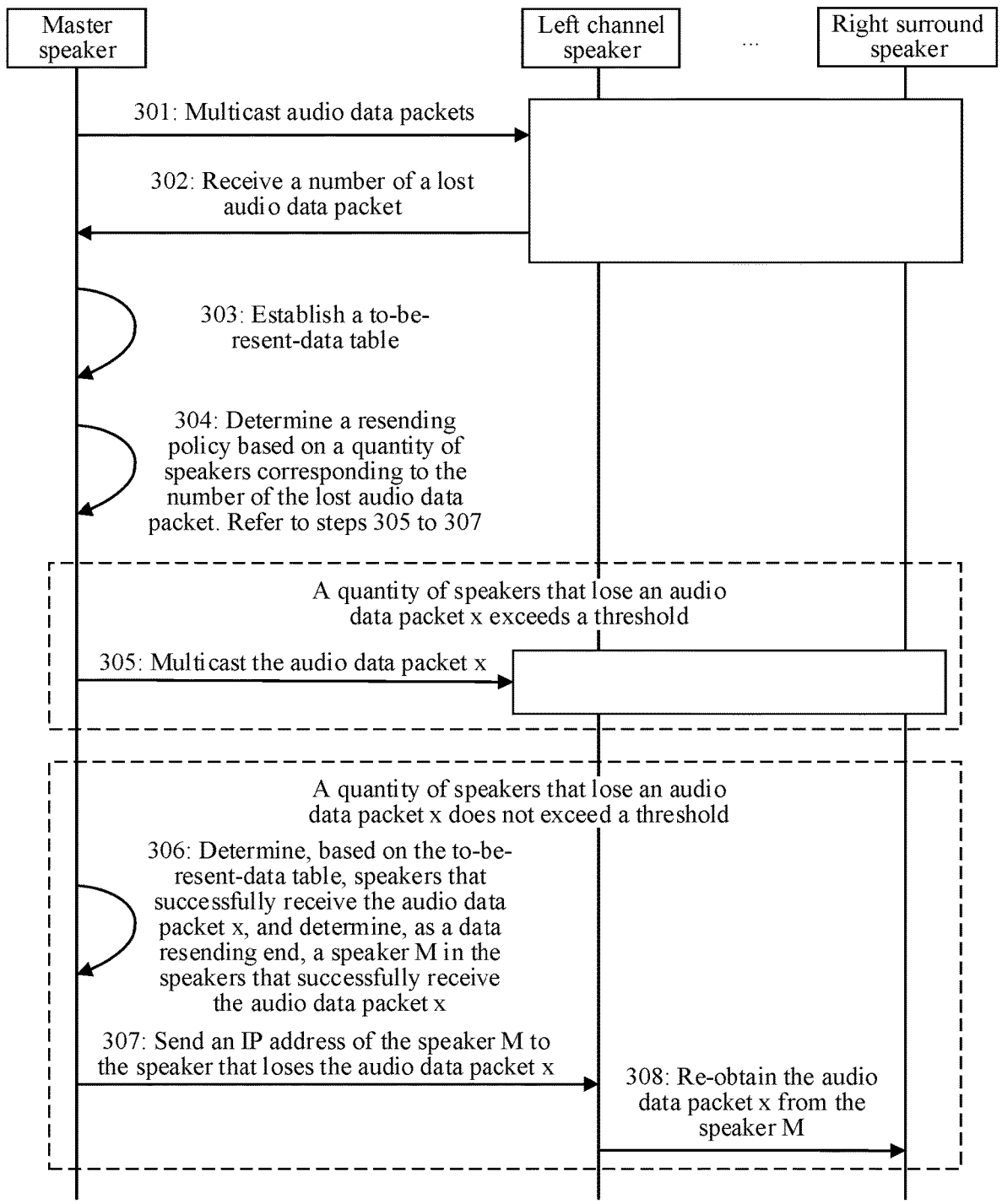
FIG. 5 is a flowchart of another data transmission method according to an embodiment of this application.

This application further provides a computer-readable storage medium. The computer-readable storage medium stores instructions. When the instructions are run on a computer, the computer is enabled to perform the steps in the data transmission method shown in FIG. 3 or FIG. 5.

This application further provides a computer program product including instructions. When the computer program product runs on a computer or any one of at least one processor, the computer is enabled to perform the steps in the data transmission method shown in FIG. 3 or FIG. 5.

This application further provides a chip, including a processor and a data interface. The processor reads, by using the data interface, instructions stored in a memory, to perform a corresponding operation and/or procedure performed in the data transmission methods provided in this application.

Optionally, the chip further includes the memory. The memory is connected to the processor through a circuit or a cable. The processor is configured to read and execute a computer program in the memory. Further, optionally, the chip further includes a communication interface. The processor is connected to the communication interface. The communication interface is configured to receive data and/or information that need/needs to be processed. The processor obtains the data and/or information from the communication interface, and processes the data and/or information. The communication interface may be an input/output interface.

The memory may be a read-only memory (read-only memory, ROM) or another type of static storage device that can store static information and instructions, or a random access memory (random access memory, RAM) or another type of dynamic storage device that can store information and instructions, may be an electrically erasable programmable read-only memory (electrically erasable programmable read-only memory, EEPROM), a compact disc read-only memory (compact disc read-only memory, CD-ROM) or another compact disc storage, an optical disc storage (including a compact optical disc, a laser disc, an optical disc, a digital versatile disc, a Blu-ray disc, or the like), or a magnetic disk storage medium or another magnetic storage device, or may be any other medium that can be for carrying or storing expected program code in a form of instructions or a data structure and that can be accessed by a computer.

In embodiments of this application, "at least one" means one or more, and "a plurality of" means two or more than two. The term "and/or" describes an association relationship between associated objects and represents that three relationships may exist. For example, A and/or B may represent the following cases: Only A exists, both A and B exist, and only B exists. A and B may be singular or plural. The character "/" generally indicates an "or" relationship between the associated objects. "At least one of the following" or a similar expression thereof indicates any combination of the items, and includes a singular item or any combination of plural items. For example, at least one of a, b, or c may indicate a, b, c, a and b, a and c, b and c, or a, b, and c, where a, b, and c may be singular or plural.

A person of ordinary skill in the art may be aware that, units and algorithm steps in embodiments disclosed in this specification can be implemented by electronic hardware, and a combination of computer software and electronic hardware. Whether the functions are performed by hardware or software depends on particular applications and design constraints of the technical solutions. A person skilled in the art may use different methods to implement the functions for all particular applications, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, when any function is implemented in the form of a software functional unit and sold or used as an independent product, the function may be stored in a computer-readable storage medium. Based on such an understanding, the technical solutions in this application essentially, the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes: any medium that can store program code, such as a USB flash drive, a removable hard disk, a read-only memory (read-only memory, ROM), a random access memory (random access memory, RAM), a magnetic disk, or a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A data transmission method performed by a sending end, and comprises:
   sending a first data packet in a multicast manner to a first multicast group, wherein the first multicast group comprises a plurality of receiving ends;
   determining a quantity N of receiving ends in the first multicast group that fail to receive the first data packet, wherein the step of determining the quantity N comprises:
      receiving a first message sent by each of the receiving ends that fail to receive the first data packet, wherein the first message comprises an identifier of the first data packet that fails to be received;
      establishing a to-be-resent-data table based on the identifier that is comprised in each first message and that is of the data packet that fails to be received, wherein the to-be-resent-data table comprises an identifier of each data packet that fails to be received, and the identifier of each data packet is associated with an identifier of a receiving end that fails to receive the data packet; and
      determining, based on the to-be-resent-data table, the quantity N of receiving ends that fail to receive the first data packet; and
   sending, in response to N being less than a first threshold, information about a first receiving end to the receiving ends that fail to receive the first data packet, wherein the first receiving end successfully receives the first data packet.

2. The method according to claim 1, wherein the first threshold is determined based on a quantity of the receiving ends comprised in the first multicast group.

3. The method according to claim 1, further comprising:
   identifying receiving ends that successfully receive the first data packet; and
   selecting the first receiving end in the receiving ends that successfully receive the first data packet.

4. The method according to claim 3, wherein the step of selecting the first receiving end in the receiving ends that successfully receives the first data packet comprises:
   obtaining resource occupation information of the receiving ends that successfully receive the first data packet; and
   selecting, based on the resource occupation information, the first receiving end in the receiving ends that successfully receive the first data packet.

5. The method according to claim 1, wherein the step of sending the first data packet to the first multicast group in a multicast manner comprises:
   sending a plurality of data packets having consecutive identifiers to the first multicast group in the multicast manner, wherein the plurality of data packets having the consecutive identifiers comprise the first data packet.

6. The device according to claim 1, wherein the processor is further configured to perform operations of:
   identifying receiving ends that successfully receive the first data packet; and
   selecting the first receiving end in the receiving ends that successfully receive the first data packet.

7. The device according to claim 6, wherein the processor is configured to perform the operation of selecting the first receiving end by obtaining resource occupation information of the receiving ends that successfully receive the first data packet; and
   selecting, based on the resource occupation information, the first receiving end in the receiving ends that successfully receive the first data packet.

8. An electronic device in a network for data transmission, comprising:
   a memory storing executable instructions;
   a processor configured to execute the executable instructions to perform operations of:
   sending a first data packet to a first multicast group in a multicast manner, wherein the first multicast group comprises a plurality of receiving ends;
   determining a quantity N of receiving ends in the first multicast group that fail to receive the first data packet, wherein the step of determining the quantity N comprises:
      receiving a first message sent by each of the receiving ends that fail to receive the first data packet, wherein the first message comprises an identifier of the first data packet that fails to be received;
      establishing a to-be-resent-data table based on the identifier that is comprised in each first message and that is of the data packet that fails to be received, wherein the to-be-resent-data table comprises an identifier of each data packet that fails to be received, and the identifier of each data packet is associated with an identifier of a receiving end that fails to receive the data packet; and determining, based on the to-be-resent-data table, the quantity N of receiving ends that fail to receive the first data packet; and sending, in response to N being less than a first threshold, information about a first receiving end to the receiving ends that fails to receive the first data packet, wherein the first receiving end successfully receives the first data packet.

9. The device according to claim 8, wherein the processor is configured to perform the operation of sending the first data packet by:

sending a plurality of data packets having consecutive identifiers to the first multicast group in the multicast manner, wherein the plurality of data packets having the consecutive identifiers comprise the first data packet.

\* \* \* \* \*